Feb. 9, 1960
S. GOLDEN
2,924,562
METHOD OF FREE RADICAL PRODUCTION AND STABILIZATION
Filed Aug. 18, 1958
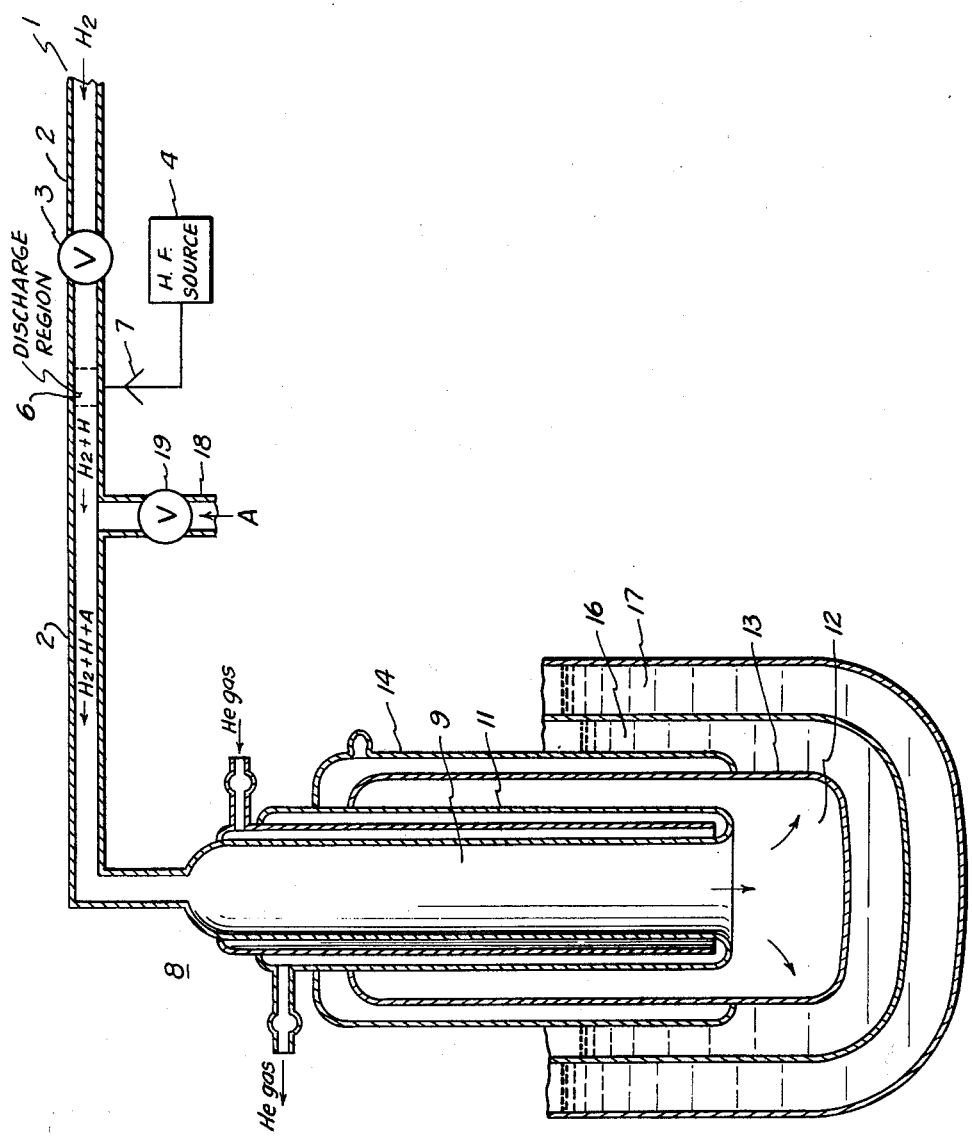
INVENTOR
*Sidney Golden*
*Arthur Vinograd*
BY *John C. Stahl*
ATTORNEYS

United States Patent Office 2,924,562
Patented Feb. 9, 1960

2,924,562

METHOD OF FREE RADICAL PRODUCTION AND STABILIZATION

Sidney Golden, Lexington, Mass.

Application August 18, 1958, Serial No. 755,816

5 Claims. (Cl. 204—164)

(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952), section 266.

This invention relates to the entrapment by freezing out at low temperatures free radicals and atoms, and more particularly, is directed to a method for enhancing the production and stabilization of low temperature products. Specifically, the present invention represents an improvement over the disclosure in the copending application, Serial No. 484,860 of Broida and Pellam, filed January 28, 1955, now Patent No. 2,892,766, and assigned to the assignees of this application.

The application referred to above discloses a method and apparatus for obtaining substantial concentrations in solid form of free radicals and atoms of ordinarily diatomic molecules. The activated species are drawn from an electric discharge into a low temperature region maintained at between 4° K. and 35° K., i.e. at 4.2 degrees K. Since all gases except helium are in solid form at this temperature, the low temperature region acts as a high vacuum pump drawing the electrical discharge products into it. The frozen products collected on the walls of the container enclosing the discharge region contain approximately a one percent concentration of atoms or free radicals.

This invention provides means for substantially increasing the percentage concentration of active species contained in the low temperature solid product. The improved results are brought about by the addition of a nonreactive gas to the combination of a molecular gas and activated specie emanating from the electrical discharge region. In terms of gas flow the inert additive is combined with the molecular gas subsequent to its exposure to the electrical discharge but prior to its entry into the low temperature region. The inert additive gas or diluent, as it will be hereafter referred to throughout the remainder of the specification, serves to isolate the activated constituents produced in the electrical discharge so that fewer tend to recombine at low temperature.

It is therefore one object of this invention to provide a process for obtaining an increased yield of atoms and free radicals.

Another object of this invention is to provide means for increasing the percentage concentration of atoms and free radicals obtained from a gas subject to an electrical discharge.

Still another object of this invention is to provide means for minimizing the recombination of the activated species at low temperatures.

An additional object of this invention is to provide means for stabilizing atoms and free radicals produced from gases ordinarily composed of diatomic molecules.

A better understanding of the invention can be had from reference to the single figure of the drawing which shows a specific embodiment of the apparatus for obtaining the objects outlined above.

As shown in the drawing, a gas subject to dissociation under the influence of electrical discharge is introduced into end 1 of a conduit 2. The gas by way of example only, may be $N_2$, $O_2$, $H_2$, and $H_2O$, or any combination of these, and may be supplied from a commercial gas cylinder (not shown). A valve 3 is provided in conduit 2 for controlling the rate of flow of gas through the conduit.

Also shown in the drawing is a high-frequency electrical source 4 for supplying energy to a discharge region 6 forming a portion of conduit 2. An example of such a high-frequency source and feed circuit is disclosed in an article by Zelikoff et al., J. Opt. Soc. Am., 42, 818 (1952). The high-frequency electrical energy is coupled to the discharge region through an antenna or a waveguide cavity resonator indicated diagrammatically at 7. The gas in discharge region 6 is dissociated to a combination of the original gas and activated species in a well-known manner. The gas passes from conduit 2 into a cryogenic condensing container indicated generally at 8.

The center portion of container 8 is comprised of a cylindrical chamber 9 surrounded by compound walls 11. Helium gas at room temperature is continually passed through compound walls 11 to provide a cylindrical sheath of gas at room temperature about chamber 9 in order to prevent condensation of the discharge products. Upon leaving the room temperature chamber 9 the gas products enter the low temperature region 12 enclosed by the single wall structure 13. The frozen products are deposited on the vertical side walls of container 13. A cylindrical double-walled vacuum container 14 provides vacuum insulation to isolate chamber 9 from the ambient temperature.

The lower portion of the condensing unit is completely enclosed by a surrounding jacket of liquid helium 16 to maintain low temperature region 12 at 4.2° K. An additional jacket of liquid nitrogen 17 may be included to reduce the amount of liquid helium required to maintain region 12 at the very low temperature.

It is evident from the apparatus disclosed in the drawing that the dissociated gas containing a substantial concentration of activated species passes through chamber 9 at substantially room temperature. Due to the fact that all elements except helium are in the solid state in region 12 a near-perfect vacuum is formed therein causing the gaseous products to pass rapidly from discharge region 6 into low temperature region 12, the solid products are immediately condensed on walls 13.

The improvement of the instant invention includes the incorporation of an auxiliary conduit 18 for supplying an additional gas to the products of discharge region 6 prior to their entry into condensation container 8. In a modification of the preferred embodiment of this invention the conduit for supplying the inert gas is positioned subsequent to the discharge region. By positioning the source of inert gas prior to the disassociation of the original gas it is possible to further "insulate" the activated constituents so that fewer species tend to recombine in the conduit.

A suitable source of nonreactive gas (not shown) connected to conduit 18 supplies a diluent to conduit 2 through valve 19. The gas used as a diluent for stabilizing the discharge products from region 6 may be any gas which will not react with the activated species passing through conduit 2. By way of example only, gases such as argon, neon, and krypton are particularly suited for this application; however, it should be emphasized that the present disclosure is not limited to the recited gases but that any nonreactive gas may be used as a diluent for this purpose.

The action of the diluent gas in bringing about a substantial increase in the percentage concentration of frozen radicals and atoms may now be described.

The probability that a typical location in the condensed solid will ultimately contain a frozen free radical is dependent upon two factors: first, the probability that a free radical is deposited in said location and, secondly, the probability that one of the neighboring locations in the condensed solid are occupied by deposited specie capable of reacting with the free radical which may have been deposited. The two probabilities are related in such a manner that when one increases the other decreases, and vice versa. Their product yields the overall probability that a typical location in the condensed solid will contain a stabilized frozen free radical and is equal to the fraction of stabilized frozen free radicals in the solid. Because of the compensating effects that the separate probabilities contribute to the overall result, it is evident that the largest value of the fraction of frozen free radicals may be achieved by suitable alteration of the related probabilities of condensing free radicals and inert atoms in typical locations in the solid.

By way of example only, the probability that a typical location in the solid will have a free radical deposited in it is equal to the original free radical fraction in the gas, $f_0$. The probability that Z neighboring sites will have deposited in them inert specie which comprise a fraction $(1-f_0)$ of the gas is $(1-f_0)^Z$. The fraction of stabilized free radicals is accordingly $f_0(1-f_0)^Z$. From this expression it is evident that there will be a maximum frozen radical fraction when the gas fraction is $$f_0 = \frac{1}{Z+1}$$

For this condition, the frozen free radical fraction is approximately given by the expression $$\frac{0.35}{Z}$$

In terms of the present example this value is the maximum attainable fraction of frozen free radicals and any different value of the gas composition from that which has been indicated will yield a smaller amount of frozen free radicals. Typical values of Z are about 10 so that for the present example a condensed fraction of about 3% is obtainable from an original gas fraction of about 9%.

From the above analysis it can be seen that the present invention provides a mechanism for producing increased amounts of free radicals and atoms. While the fraction of activated species in conduit 2 emanating from discharge region 6 is reduced by recombination in the conduit, the total concentration in the condensed phase in low temperature region 12 is larger due to the insulating effect of the molecules of the diluent gas. In terms of the above analysis, and by way of example only, a gaseous discharge containing 50% atoms and 50% oxygen molecules would yield in the low temperature region 12 a typical maximum concentration of atomic oxygen of 0.05%. With the addition of ten times the original amount of oxygen molecules as a diluent as described in the specification, the concentration of atomic oxygen produced in the low temperature region 12 would be increased to about 3%.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. An improved method of increasing the yield of activated specie in a solid state consisting of atoms and free radicals produced by the dissociation of a molecular gas in combination with nondissociated molecular gas comprising the steps of adding a diluent comprising a gas at ambient temperature and at a pressure of from 0.1 to 10 mm. Hg which is nonreactive with said activated specie to said specie and passing the mixture of said diluent and said specie into a region at a temperature between 4° K. and 35° K.

2. An improved method for increasing the yield of activated specie in a solid state, said specie consisting of atoms and free radicals produced by the dissociation of a molecular gas in combination with nondissociated molecular gas comprising the steps of adding an inert gas diluent at embient temperature and at a pressure of from 0.1 to 10 mm. Hg to said dissociated specie and causing the mixture of said diluent and said specie to be rapidly drawn into a low temperature region of between 4° K. and 35° K.

3. An improved method for increasing the yield of activated specie in a solid state, said activated specie consisting of atoms and free radicals produced by dissociating a molecular gas in combination with nondissociated molecular gas comprising the steps of adding a gas selected from the group consisting of argon, krypton, and neon at ambient temperature and at a pressure of 0.1 to 10 mm. Hg to said specie and passing the mixture of said gas and said specie into a low temperature region of between 4° K. and 35° K.

4. An improved method for increasing the yield of activated specie in a solid state, said activated specie consisting of atoms and free radicals in combination with molecular gases comprising the steps of subjecting a gas capable of being disassociated by an electrical discharge to an electrical discharge, adding an inert diluent at ambient temperature and at a pressure of 0.1 to 10 mm. Hg to said discharge and pumping the mixture into a low temperature region between 4° K. and 35° K.

5. An improved method for increasing the yield of atoms and free radicals in combination with molecular gases in a solid state comprising the steps of applying at ambient temperature an electric discharge to a gas subject to disassociation under the influence of said discharge, adding a gas selected from the group consisting of argon, krypton, and neon at ambient temperature and at a pressure of from 0.1 to 10 mm. Hg to the products of said discharge and rapidly passing the mixture to a temperature region of between 4° K. and 35° K.

References Cited in the file of this patent

UNITED STATES PATENTS

| | | |
|---|---|---|
| 2,876,077 | Haller | Mar. 3, 1959 |
| 2,876,188 | Thorp et al. | Mar. 3, 1959 |